Patented Apr. 28, 1953

2,636,874

UNITED STATES PATENT OFFICE 2,636,874

HALOGEN-CONTAINING RESINS DERIVED FROM 2-ALKENOXYALKYL ESTERS AND BROMOMETHANES

Robert A. Gregg, Passaic, N. J., assignor to United States Rubber Company, New York, N. Y., a corporation of New Jersey No Drawing. Application November 9, 1950, Serial No. 194,930

9 Claims. (Cl. 260—45.5)

My invention concerns a new method for the preparation of a novel class of soluble, unsaturated, halogen-containing resins derived from the esters of certain 2-alkenoxyalkyl alcohols and alpha-olefinic carboxylic acids, hereinafter designated as 2-alkenoxyalkyl esters. These new polymers can be converted to an insoluble and substantially infusible state by further polymerization as well as by copolymerization with reactive ethylenic compounds to yield a variety of molded, coated, laminated and impregnated articles of improved flame-resistance.

Polymers and copolymers of 2-alkenoxyalkyl esters such as di-beta-allyloxyethyl fumarate are of considerable industrial interest in the field of coating compositions where their favorable color-retention, solvent-resistance and heat-stability are especially attractive. However, the widespread use of these polymers and copolymers has been severely limited by the difficulty in obtaining them in an initially soluble, fusible form, which after application, e. g., coating or molding, can be cured to a solvent- and heat-resistant state. In the preparation of such resins, the reaction mixture gels before more than a minor proportion of the monomeric materials present has been converted to the polymeric form and the resulting intractable mixture of insoluble gel, low molecular weight polymers and unreacted monomers is of little or no commercial utility. By halting the polymerization before gelation occurs, a small amount of soluble, unsaturated, polymer can be obtained in some cases, although it must be subjected to extensive purification to remove the unreacted starting materials and the latter, for economic reasons, must be recovered, purified and recycled for use in subsequent polymerizations. The prior art attempts to increase the economic feasibility of this process have not met with any significant degree of success, since these processes for increasing the amounts of ungelled polymers obtained by carrying out the reaction in the presence of large amounts of catalyst, inhibitors, diluents and/or at high temperatures frequently entail additional purification steps in order that the properties of the resulting resin not be impaired by the presence of catalyst fragments, inhibitors, etc.

I have now discovered that the prior art difficulties in obtaining high yields of soluble, unsaturated polymers of such 2-alkenoxyalkyl esters can be successfully overcome by conducting the polymerization or copolymerization in the presence of a bromomethane containing at least two additional halogen atoms from the class of chlorine and bromine, viz., bromotrichloromethane, bromodichloromethane, dibromodichloromethane, dibromochloromethane, tribromochloromethane, bromoform, or carbon tetrabromide. These compounds have the structure $BrCX_3$, wherein the X's are selected from the group hydrogen, bromine, and chlorine, at least two of the X's being halogen.

The resulting soluble, unsaturated resins are obtained in high yields and contain very appreciable amounts (e. g., typically 25% or more) of halogen. This is surprising since halogenated compounds devoid of unsaturation, e. g., carbon tetrachloride, have heretofore not been regarded by the art as capable of entering into the polymerization to any great extent. Upon investigation, however, I have found that when the polyhalogenomethane contains at least one bromine atom, the reactivity with a polymerizing 2-alkenoxyalkyl ester is remarkably and unexpectedly enhanced.

As noted in the art, the disadvantageously premature gelation of a polymerizing 2-alkenoxyalkyl ester can be postponed to some extent by carrying out the reaction in the presence of a comparatively inert solvent such as carbon tetrachloride, but the volume of solvent required is prohibitively large for economical operation and the amount of halogen introduced into the polymer is insignificant. In my invention, on the contrary, the polymerization of the 2-alkenoxyalkyl ester in the presence of as little as approximately 5% by weight of a bromohalomethane from the class defined above effects a very significant increase in the amount of monomeric ester converted to the soluble polymeric form and likewise introduces an appreciable amount of halogen into the polymer. As the amount of the bromohalomethane in the reactant mixture is increased, both the yield and halogen content of the resulting soluble polymers are increased correspondingly. While optimum yields of soluble polymers may be secured from reactant mixtures containing as much as 250% of the bromohalomethane based on the 2-alkenoxyalkyl ester, I have found that the reactant mixtures need not contain in substantial excess of 200% by weight of the bromohalomethane for most applications. Indeed, for reasons of economy and efficiency I ordinarily prefer to employ polymers from reactant mixtures containing approximately 35–100% by weight of the bromohalomethane since they possess the requisite flame-resistance, all my polymers being completely self-extinguishing by ASTM test D-638-44 when they contain in excess of approximately 25% by weight of halogen.

It will be seen that the amount of the selected bromomethane compound employed in practicing the present invention may range from 5 to 250% by weight based on the total weight of unsaturated, polymerizable monomers, and preferably ranges from 35 to 100%.

The percentage of combined halogen in resins made in accordance with the present invention may vary widely, depending upon many factors, but will ordinarily range from 5 to 50% and is preferably in excess of 25% by weight.

Suitable 2-alkenoxyalkyl esters for use in my invention include the esters prepared from 2-alkenoxyalkanols of the formula

RCH=CR—CH₂—O—CHR'—CHR'—OH where one of the radicals R is hydrogen, while the other is selected from the class consisting of hydrogen, chlorine, methyl, ethyl and phenyl, and each R' is hydrogen or alkyl, e. g., methyl, ethyl, propyl, butyl, amyl, hexyl, heptyl and octyl. Such alcohols are beta-allyloxyethyl, beta-methallyloxyethyl and beta-allyloxypropyl alcohols of which those in which the terminal substituent R is hydrogen are preferred. The polyolefinic esters derived from the 2-alkenoxyalkyl alcohols are of particular interest to the surface-coating industry since such esters yield "air-drying" polymers in many cases.

Such 2-alkenoxyalkyl alcohols are esterified with alpha-olefinic mono- or polycarboxylic acids to yield the 2-alkenoxyalkyl esters employed in my invention. Such acids include acrylic, methacrylic, ethacrylic, chloroacrylic, crotonic, maleic, fumaric, citraconic, mesaconic and aconitic acids. Typical esters are beta-allyloxyethyl acrylate, di-beta-allyloxyethyl fumarate, di-beta-allyloxyethyl maleate, diallyloxyethyl itaconate, and di-beta-allyloxyethyl citraconate.

The properties of my new polymers can be modified with respect to hardness, flexibility, initial compatibility with solvents, and other properties, by copolymerizing the unpolymerized mixture of the 2-alkenoxyalkyl ester and the bromohalomethane with a monoolefinic compound, or mixture of such compounds, selected from the following classes, thus forming terpolymers:

(a) aryl-substituted vinyl compounds, i. e., styrene, p-methyl styrene, p-chlorostyrene, 2,5-dichlorostyrene, alpha-vinylnaphthalene and alpha-vinylpyridine (in which category I also include compounds wherein the hydrogen atoms of the vinyl group may be substituted, as in alpha-methyl styrene, such compounds being sometimes referred to loosely as vinyl-type compounds).

(b) mono-vinyl ethers and esters, e. g., ethyl vinyl ether, propyl vinyl ether, isopropyl vinyl ether, butyl vinyl ether, phenyl vinyl ether, benzyl vinyl ether, vinyl acetate, vinyl propionate, vinyl butyrate, vinyl benzoate and vinyl chloride.

(c) alpha-alkenoic acids and derivatives hydrolyzable thereto, e. g., acrylic acid, methyl acrylate, methyl methacrylate, tolyl acrylate, benzyl acrylate, methyl chloroacrylate, methyl crotonate, acrylonitrile, methacrylonitrile, acrylamide, methacrylamide, diethyl fumarate, dimethyl maleate, di-2-ethylhexyl itaconate, maleimide, and N-methylmaleimide.

(d) olefins, such as isobutylene.

The monoolefinic compound may be added to the mixture in any amount up to about 6 mols, and preferably in the range 0.5–2.0 mols, per mol of 2-alkenoxyalkyl ester.

My new polymers are prepared by heating a mixture of the 2-alkenoxyalkyl ester and the bromohalomethane, optionally with the addition of the said monoolefinic compound, at temperatures ranging from 25° to 150° C., the temperature depending on the catalyst employed. The reaction must usually be carried out under superatmospheric pressure at the higher temperatures.

The polymerization reaction is catalyzed by peroxidic compounds; e. g., acetyl peroxide, tert butyl peroxide, tert butyl hydroperoxide, acetyl benzoyl peroxide, and benzoyl peroxide, and by diazo compounds capable of generating free radicals; e. g., azobisisobutyronitrile, in concentrations of from approximately 0.1 to 5.0% by weight of the reactant mixture. An inert atmosphere, e. g., nitrogen, is desirable to ensure the formation of clear, water-white products. Since the polymerization is exothermic, industrial-scale preparations require only moderate heating, and control of the reaction is assured by gradual addition of the bromohalomethane to the polymerizing reaction mixture with vigorous agitation thereof. The course of the polymerization can be followed by observing the increase in the viscosity or of the refractive index of the reaction mixture. When the reaction has proceeded to the desired extent it is halted by cooling.

Purification of the viscous, syrup-like reaction products is unnecessary, for essentially all of the starting materials are utilized in my process. This is a distinct advantage over the prior art wherein the reaction products must be subjected to additional and expensive purification steps, e. g., distillation, extraction and precipitation, to remove solvents, inhibitors, unreacted starting materials, insoluble gel and other undesirable by-products.

Hence, my reaction products can be employed directly and without prior art modifications in a wide variety of commercial applications. My resins can be used alone or in conjunction with suitable dyes, fillers, plasticizers, solvents and copolymerizable mono-ethylenic compounds, e. g., esters of the acrylic, maleic, vinyl and allyl types. Upon heating compositions containing my polymers to elevated temperatures, e. g., 25–150° C., and preferably with polymerization catalysts, e. g., peroxides or the said diazo compounds, they are converted to a solvent- and heat-resistant form ranging in character from flame-retardant to completely non-flammable in proportion to their halogen content as described above.

When the soluble, fusible resin of my invention is mixed with a reactive monomeric ethylenic compound copolymerizable therewith and the resulting mixture is polymerized to the insoluble, substantially infusible stage, the proportion of copolymerizable mono-ethylenic material may vary widely, depending upon the properties desired in the final product. Preferably it is such that the proportion of combined halogen in the final cured resin is still sufficient to render it flame-resistant, the ranges for halogen content of the fusible resin given above applying equally to the final insoluble, infusible resin.

In some cases the fusible, soluble polymerization reaction product resulting from the initial polymerization of the 2-alkenoxyalkyl ester in the presence of the bromomethane compound may be employed directly in that form where it is desired to take advantage of its fusible, soluble nature and its flame-resistant properties. For example, it may be employed where its thermoplastic or soluble properties are advantageous. Thus it may be mixed with a suitable solvent to give a coating or impregnating composition. In any event, however, it is generally preferred to convert it ultimately to the insoluble, substantially infusible stage.

The following example will serve to illustrate the practice of my invention in more detail. All parts are by weight.

EXAMPLE (a) A mixture of 14.2 parts of di-beta-allyl-oxyethyl fumarate, 3.25 parts of bromotrichloromethane and 0.07 part of benzoyl peroxide is heated at 60° C. for 3 hours during which time a mixture of 3.25 parts of bromotrichloromethane and 0.07 part of benzoyl peroxide is added in equal increments at intervals of 0.5 hour. The reaction mixture is heated for 21 additional hours after which 0.14 part of benzoyl peroxide is added and heating is continued for 29 more hours with no sign of gelation.

From the reaction mixture are obtained approximately 17.6 parts of soluble, unsaturated interpolymer; total halogen (as chlorine) = 16.86%; iodine number (Wijs) = 87. The polymer is readily cured to a solvent- and heat-resistant product by heating.

(b) Repetition of the above polymerization reaction in the absence of the bromotrichloromethane brings incipient gelation of the reaction mixture within about 8 hours and yields only about 3.2 parts of soluble polymer.

Having thus described my invention, what I claim and desire to protect by Letters Patent is:

1. A method of polymerizing a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, which comprises heating a mixture of said ester with from 5 to 250 per cent by weight, based on the weight of said ester, of a bromomethane compound of the general formula $BrCX_3$ where the X's are selected from the group consisting of hydrogen, bromine and chlorine, at least two of the X's being halogen, and a free-radical polymerization initiator.

2. A method of polymerizing a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, which comprises subjecting said ester to a temperature of from 25° to 100° C., in the presence of a peroxidic polymerization catalyst and during the polymerization adding gradually to the reaction mixture a bromomethane compound of the general formula $BrCX_3$ where the X's are selected from the group consisting of hydrogen, bromine and chlorine, at least two of the X's being halogen, whereby controlled reaction of the said ester with said added bromomethane compound is effected with consequent introduction of halogen into the resulting polymer, the amount of said bromomethane compound employed being from 5 to 250 per cent of the weight of said ester, and continuing the reaction whereby a soluble, fusible, unsaturated, halogen-containing resin is produced.

3. A soluble, fusible, unsaturated, halogen-containing resin which is the polymerized reaction product of (A) a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen, and the other is a radical selected from the group consisting of hydrogen, chlorine, methyl, ethyl, and phenyl, and R' is a radical selected from the group consisting of hydrogen and alkyl, and (B) from 5 to 250 per cent by weight, based on the weight of said ester, of a bromomethane compound of the general formula $BrCX_3$ where the X's are selected from the group consisting of hydrogen, bromine and chlorine, at least two of the X's being halogen.

4. A soluble, fusible, unsaturated, halogen-containing resin which is the polymerized reaction product of (A) a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, and (B) from 35 to 100 per cent by weight, based on the weight of said ester, of a bromomethane compound of the general formula $BrCX_3$ where the X's are selected from the group consisting of hydrogen, bromine and chlorine, at least two of the X's being halogen.

5. A soluble, fusible, unsaturated, halogen-containing resin which is the polymerized reaction product of (A) a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, (B) a reactive monomeric monoolefinic compound copolymerizable therewith, in relative proportions of from 0.1 to 6.0 molar equivalents of said copolymerizable monoolefinic compound per mole of said ester, and (C) from 5 to 250 per cent by weight, based on the combined weight of said ester and said copolymerizable compound, of a bromomethane compound of the general formula $BrCX_3$ where the X's are selected from the group consisting of hydrogen, bromine and chlorine, at least two of the X's being halogen.

6. A resin comprising the polymerized reaction product of (A) a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, and (B) from 5 to 250 per cent by weight, based on the weight of said ester, of a bromomethane compound of the general formula $BrCX_3$ where the X's are selected from the group consisting of hydrogen, bromine, and chlorine, at least two of the X's being halogen, said resin containing from 5 to 50 per cent by weight of combined halogen.

7. A resin comprising the polymerized reaction product of (A) a monomeric 2-alkenoxyalkyl ester of an alpha-ethylenic carboxylic acid wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, and (B) from 5 to 250 per cent by weight, based on the weight of said ester, of a bromomethane compound of the general formula $BrCX_3$ where the X's are selected from the group consisting of hydrogen, bromine, and chlorine, at least two of the X's being halogen, said resin containing from 25 to 50 per cent by weight of combined halogen.

8. A flame-resistant, insoluble, substantially infusible, halogen-containing resin which is the polymerized reaction product of (A) a monomeric 2-alkenoxyalkyl ester of an alpha-ethylene carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl and (B) from 5 to 250 per cent by weight, based on the weight of said ester, of a bromomethane compound of the general formula $BrCX_3$ where the X's are selected from the group consisting of hydrogen, bromine, and chlorine, at least two of the X's being halogen.

9. A polymerizable mixture comprising (A) a soluble, fusible, unsaturated, halogen-containing resin which is the polymerized reaction product of a monomeric 2-alkenoxyalkyl ester of an alpha-ethylenic carboxylic acid, wherein the 2-alkenoxyalkyl group is the radical of a 2-alkenoxyalkanol of the formula $$RCH=CR-CH_2-O-CHR'-CHR'-OH$$

where one R is hydrogen and the other is a radical selected from the group consisting of hydrogen, chlorine, methyl, ethyl, and phenyl, and R' is a radical selected from the group consisting of hydrogen and alkyl, and from 5 to 250 per cent by weight, based on the weight of said ester, of a bromomethane compound of the general formula $BrCX_3$ where the X's are selected from the group consisting of hydrogen, bromine, and chlorine, at least two of the X's being halogen, and (B) a reactive monomeric monoolefinic compound copolymerizable with said resin, said mixture being capable of yielding upon polymerization an insoluble, substantially infusible resin.

ROBERT A. GREGG.

References Cited in the file of this patent

UNITED STATES PATENTS

| Number | Name | Date |
|---|---|---|
| 2,514,786 | Neher et al. | July 11, 1950 |
| 2,547,701 | Gregg | Apr. 3, 1951 |